United States Patent
Qin

(10) Patent No.: US 8,625,657 B2
(45) Date of Patent: Jan. 7, 2014

(54) METHODS, APPARATUSES AND COMPUTER PROGRAM PRODUCTS FOR CODE CORRELATION OF MULTI-PATH SPREAD SPECTRUM SIGNALS

(75) Inventor: Zhengdi Qin, Tampere (FI)

(73) Assignee: Core Wireless Licensing S.a.r.l., Luxembourg (LU)

( * ) Notice: Subject to any disclaimer, the term of this patent is extended or adjusted under 35 U.S.C. 154(b) by 789 days.

(21) Appl. No.: 12/593,944

(22) PCT Filed: Apr. 2, 2007

(86) PCT No.: PCT/IB2007/002080
§ 371 (c)(1),
(2), (4) Date: Nov. 12, 2009

(87) PCT Pub. No.: WO2008/120037
PCT Pub. Date: Oct. 9, 2008

(65) Prior Publication Data
US 2010/0111140 A1    May 6, 2010

(51) Int. Cl.
*H04B 1/7075* (2011.01)
*H04B 1/7085* (2011.01)
(52) U.S. Cl.
USPC ............................. 375/150; 375/149
(58) Field of Classification Search
USPC ................. 375/142, 145, 149, 150, 343
See application file for complete search history.

(56) References Cited

U.S. PATENT DOCUMENTS

| 5,347,536 | A | 9/1994 | Meehan ........................... 375/1 |
| 5,495,499 | A | 2/1996 | Fenton et al. .................. 375/205 |
| 5,809,064 | A | 9/1998 | Fenton et al. .................. 375/208 |
| 5,903,597 | A * | 5/1999 | Pon ................................ 375/150 |
| 6,198,765 | B1 * | 3/2001 | Cahn et al. .................... 375/142 |
| 6,463,091 | B1 * | 10/2002 | Zhodzicshsky et al. ...... 375/149 |
| 6,493,378 | B1 | 12/2002 | Zhodzishsky et al. ........ 375/149 |
| 2001/0002203 | A1 | 5/2001 | Cahn et al. .................... 375/142 |
| 2007/0098055 | A1 * | 5/2007 | Raman et al. ................. 375/150 |
| 2007/0121708 | A1 * | 5/2007 | Simpson ....................... 375/149 |

FOREIGN PATENT DOCUMENTS

EP    1 117 186 A1    7/2001
WO    WO 99/35763    7/1999

OTHER PUBLICATIONS

Roberts, Randy, "Technical Tricks, Mar. 1993: More About Sliding Correlators", 1 pgs.
"All about Correlators", Feb. 1993, Spread Spectrum Scene, Spring 96 Issue of What's New, Apr. 29, 7 pgs.

* cited by examiner

Primary Examiner — Betsy Deppe
(74) Attorney, Agent, or Firm — Ziegler IP Law Group, LLC

(57) ABSTRACT

A method including correlating a code having a first offset with a signal to produce a first correlation result; correlating the code having a second offset with the signal to produce a second correlation result; determining a cost function using the first correlation result and the second correlation result; and adjusting the first offset and the second offset in dependence upon the cost function, wherein the cost function uses a first weighting for the first correlation result and a second, different weighting for the second correlation result.

21 Claims, 2 Drawing Sheets

METHODS, APPARATUSES AND COMPUTER PROGRAM PRODUCTS FOR CODE CORRELATION OF MULTI-PATH SPREAD SPECTRUM SIGNALS

FIELD OF THE INVENTION

Embodiments of the present invention relate to correlating a code with a signal. Some embodiments relate to correlating a spreading code and a received spread spectrum communications signal that may be subject to multi-path effects.

BACKGROUND TO THE INVENTION

Spread spectrum communication techniques spread information using a pseudorandom spreading code and then transmit the spread signal. A receiver receives the spread signal and correlates the received signal against the same pseudorandom spreading code. A peak in the correlation indicates the time of arrival of the spread signal and the correlation result at that code offset provides the original information.

A problem can arise when a spread signal takes multiple different paths to the receiver by, for example, bouncing off the ground or surrounding topography or buildings. The signal from one path is noise in respect of the signal from another path.

It would be desirable to provide a receiver that operates effectively in the presence of multi-path spread spectrum signals.

BRIEF DESCRIPTION OF THE INVENTION

According to some embodiments of the invention there is provided a method comprising: correlating a code having a first offset with a signal to produce a first correlation result; correlating the code having a second offset with the signal to produce a second correlation result; determining a cost function using the first correlation result and the second correlation result; and adjusting the first offset and the second offset in dependence upon the cost function, wherein the cost function uses a first weighting for the first correlation result and a second, different weighting for the second correlation result.

According to some embodiments of the invention there is provided an apparatus comprising: a code generator configured for generating a code having a first offset and the code with a second offset; a first correlator configured for correlating the code having the first offset with a signal to produce a first correlation result; a second correlator configured for correlating the code having the second offset with the signal to produce a second correlation result; circuitry configured for determining a cost function using the first correlation result and the second correlation result and configured for controlling adjustment of the first offset and the second offset in dependence upon the cost function, wherein the cost function uses a first weighting for the first correlation result and a second, different weighting for the second correlation result According to some embodiments of the invention there is provided a computer program product which when loaded into a processor enables: determining a cost function using a first correlation result, formed by correlation of a code having a first offset with a signal, and a second correlation result, formed by correlation of the code having a second offset with the signal; controlling adjustment of the first offset and the second offset in dependence upon the cost function, wherein the cost function uses a first weighting for the first correlation result and a second, different weighting for the second correlation result.

According to some embodiments of the invention there is provided a method comprising: a) correlating a code having a first offset with a signal to produce a first correlation result; b) correlating the code having a second offset with the signal to produce a second correlation result; c) determining a cost function using the first correlation result and the second correlation result; and d) adjusting the first offset and the second offset in dependence upon the cost function to maintain a predetermined differential relationship between the first correlation result and the second correlation result.

According to some embodiments of the invention there is provided an apparatus comprising: a code generator configured for generating a code having a first offset and the code with a second offset; a first correlator configured for correlating the code having the first offset with a signal to produce a first correlation result; a second correlator configured for correlating the code having the second offset with the signal to produce a second correlation result; circuitry configured for determining a cost function using the first correlation result and the second correlation result and for configured controlling adjustment of the first offset and the second offset in dependence upon the cost function to maintain a predetermined differential relationship between the first correlation result and the second correlation result.

According to some embodiments of the invention there is provided a computer program product which when loaded into a processor enables: determining a cost function using a first correlation result, formed by correlation of a code having a first offset with a signal, and a second correlation result, formed by correlation of the code having a second offset with the signal; controlling adjustment of the first offset and the second offset in dependence upon the cost function to maintain a predetermined differential relationship between the first correlation result and the second correlation result.

The correlation that occurs using the first code with the first offset is an early correlation when it occurs with a code offset that is before that of the punctual signal and the correlation that occurs using the second code with the second offset is a late correlation because it occurs with a code offset that is after that of the punctual signal. By using values for the first offset and the second offset that are asymmetrically spaced on either side of that for the punctual signal so that the first offset is greater than the second offset, the decision window for the late correlation is reduced compared to that for the early correlation. The correlation process is therefore less affected by multi-path effects because the late correlation window is smaller.

BRIEF DESCRIPTION OF THE DRAWINGS

For a better understanding of the present invention reference will now be made by way of example only to the accompanying drawings in which.

DETAILED DESCRIPTION OF EMBODIMENTS OF THE INVENTION

Figure 1:
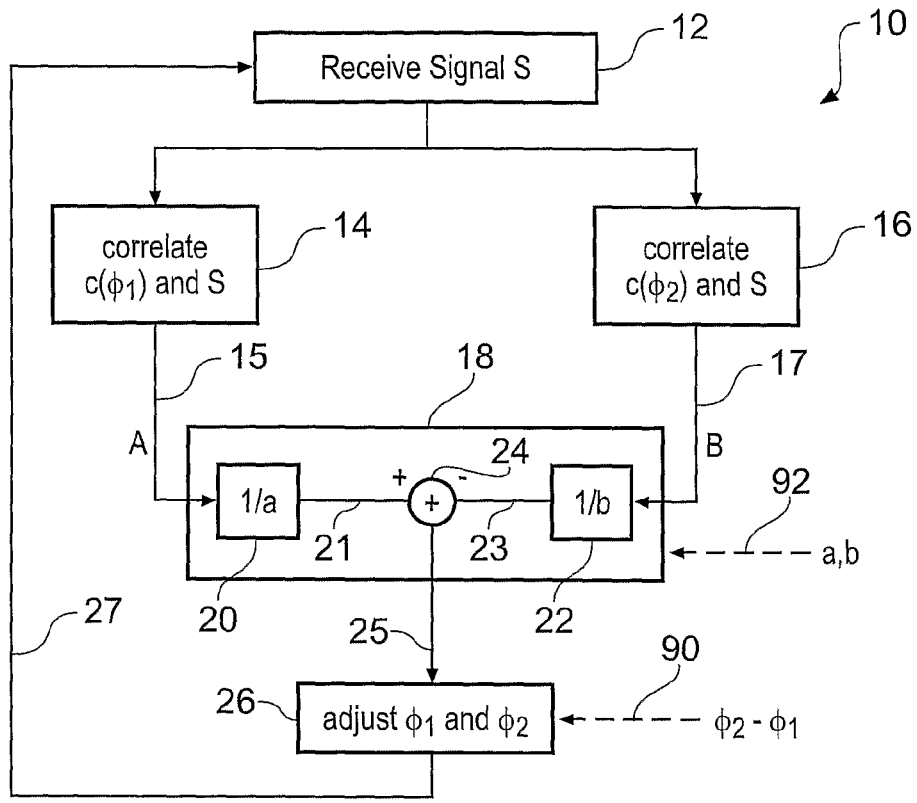
FIG. 1 schematically illustrates a method 10 for controlling correlation of a signal s and a code c.

FIG. 1 schematically illustrates a method 10 for controlling correlation of a signal s and a code c.

The signal s is typically a received spread spectrum communication signal that has been spread using a pseudorandom spreading code c. The received spread spectrum communication signal is then de-spread by correlation with the same pseudorandom spreading code c. At least two different correlations occur, with different offsets of the pseudorandom spreading code c.

Referring to FIG. 1, at step 12 the signal s is received.

Next at step 14, the code c having a first offset $\phi_1$ is correlated with the signal s to produce 15 a first correlation result A. At step 16, the same code c having a second offset $\phi_2$ is correlated with the signal s to produce 17 a second correlation result B. The second offset $\phi_2$ is delayed (late) relative to the first offset $\phi_1$ (early).

Figure 2:
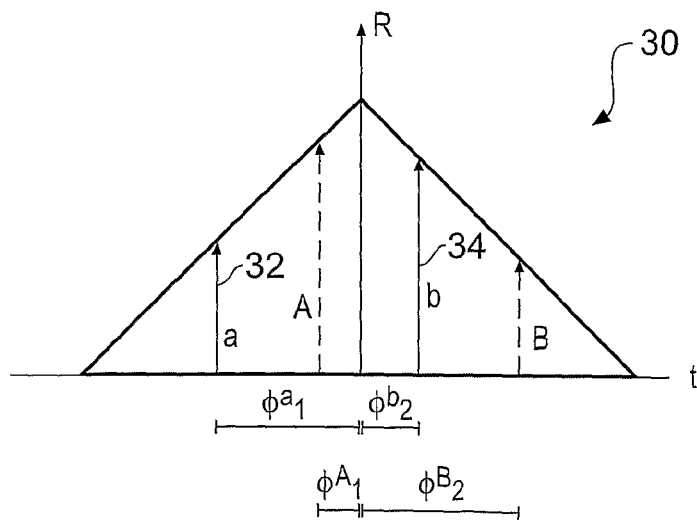
FIG. 2 illustrates 30 the auto-correlation function of the correlation processes.

FIG. 2 illustrates one auto-correlation function R 30 that could be used for the correlation steps 14, 16. This particular auto-correlation can be represented as $$R(t)=1-t/T \text{ for } -T<t<T$$

$$R(t)=0 \text{ for elsewhere.}$$

T is the chip interval of the code c.

This correlation function is a simplistic view of a typical correlation function which is used for clarity. It should be appreciated that a 'real' correlation function R may differ significantly from the simplistic function illustrated and its slopes may, for example, be non-linear.

The normalized values of the first correlation result A and the second correlation result B before feedback loop obtained lock is reached are schematically illustrated in the figure. The first correlation result A at feedback loop obtained lock is also illustrated and has a value a. The second correlation result B at feedback loop obtained lock is also illustrated and has a value b. The first offset of the code c used to obtain the first correlation result A has as a generality a value $\phi^A_1$ and at feedback loop obtained lock has a value $\phi^a_1$. The second offset of the code c used to obtain the second correlation result B has as a generality a value $\phi^B_2$ and at feedback loop obtained lock has a value $\phi^b_2$. It should be appreciated that the value of $\phi^B_2 - \phi^A_1$ is a constant, although it may be user programmable 90.

A cost function F may be defined as:

$$F=(A/a-B/b) \text{ where } a \neq b$$

and where a is the value of the correlation function, at feedback loop obtained lock, at the first offset $\phi^a_1$ and b is the value of the correlation function, at feedback loop obtained lock, at the second offset $\phi^b_2$ This function is zero valued at feedback loop obtained lock.

The relative values of a and b may be user programmable 92. The value a+b need not be a constant and may vary. The values of a and b may vary independently.

For example, the value a and/or the value of b and/or the value of a+b may be varied dynamically. In one embodiment, the size of the correlation window (a+b) is varied and/or the ratio of b/a is varied using a feedback loop to obtain optimal reception. This may result in a smaller correlation window being used in urban environments for example.

Referring back to FIG. 1, after obtaining the first correlation result A and the second correlation result B, at step 18 the cost function F is determined using the first correlation result A and the second correlation result B.

The value of the cost function F is used to adjust the first offset $\phi_1$ and the second offset $\phi_2$ and the adjusted values are fedback via feedback loop 27 and the method 10 is repeated. The feedback loop 27 may be a delay locked loop (DLL) or a phase locked loop (PLL). If the cost function F is +ve, then the first offset $\phi_1$ and the second offset $\phi_2$ are both reduced by an amount dependent upon the magnitude of F. If the cost function F is −ve, then the first offset $\phi_1$ and the second offset $\phi_2$ are both increased by an amount dependent upon the magnitude of F. The difference between $\phi_1$ and $\phi_2$ therefore remains constant. Referring back to FIG. 2, this has the effect of moving A and B towards a and b i.e. the method 10 finds a feedback loop obtained lock via a negative feedback.

When feedback loop obtained lock has been achieved, the method 10 maintains a predetermined relationship between the first correlation result A and the second correlation result B i.e. A/B=a/b where a/b<1.

Figure 3:
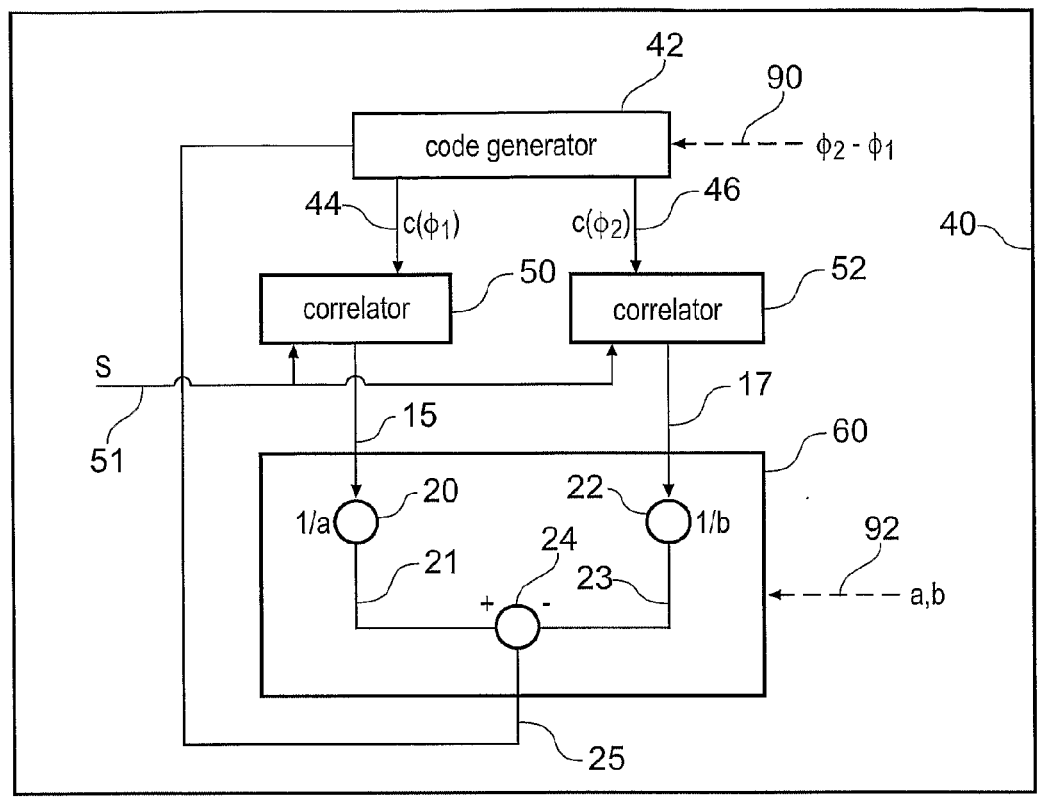
FIG. 3 schematically illustrates an apparatus that is suitable for performing the method illustrated in FIG. 1.

FIG. 3 schematically illustrates an apparatus 40 that is suitable for performing the method 10. The apparatus 40 comprises a code generator 42 for generating a code 44 with a first offset and a code 46 with a second offset, a first correlator 50 for producing the first correlation result A, a second correlator 52 for producing the second correlation result B and circuitry for controlling the code generator 42. The first correlator 50 and the second correlator 52 receive the signal s 51.

The first correlator 50 performs step 14 of the method 10. The second correlator 52 performs step 16 of the method 10. The circuitry 60 performs step 18 of the method 10. The code generator performs step 26 of the method 10.

The circuitry 60 comprises a first multiplier 20 that applies a first weighting (1/a) to the first correlation result A to produce a first weighted correlation result 21. The circuitry 60 comprises a second multiplier 22 that applies a second weighting (1/b) to the second correlation result B to produce a second weighted correlation result 23.

The circuitry 60 subtracts one of the weighted first and second correlation results from the other of the first and second weighted correlation results to produce the cost function value 25. In this implementation, the second weighted correlation result 23 (B/b) is subtracted from the first weighted correlation result 21 (A/a) as described in relation to block 24 of the method 10 shown in FIG. 1.

The cost function value 25 controls the code generator 42 to adjust the first offset and the second offset in dependence upon the cost function value 25 as described in relation to step 26 of the method 10.

The apparatus 40 may in some embodiments be a module that is sold for integration into or attachment to an electronic device. The apparatus 40 may in some embodiments be an electronic device. An electronic device may be, for example, a mobile cellular telephone, a personal wireless communication device, a satellite positioning receiver etc.

Figure 4:
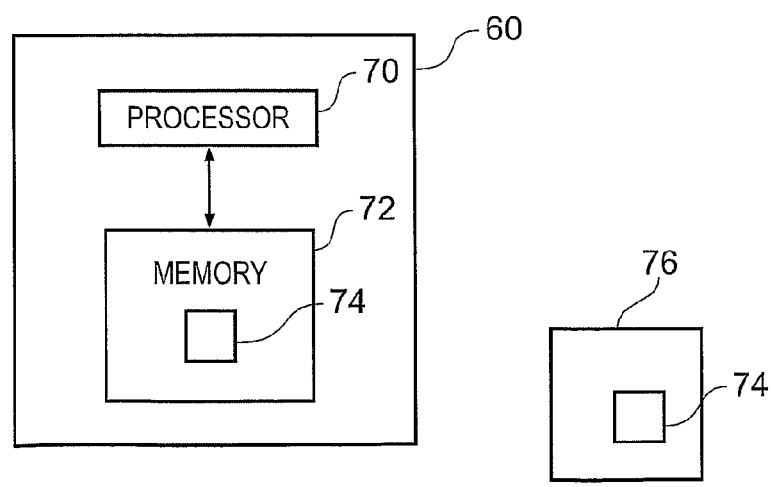
FIG. 4 schematically illustrates one embodiment of circuitry used in the apparatus.

The circuitry 60 of the apparatus 40 may be implemented in software, firmware or hardware. FIG. 4 schematically illustrates a software implementation.

FIG. 4 schematically illustrates a computer comprising a processor or controller 70 and a memory 72. The memory 72 stores computer program instructions 74 that control the operation of the circuitry 40 when loaded into the processor 70. The computer program instructions 74 provide the logic and routines that enables the electronic device to perform at least step 18 of method 10.

The computer program instructions may arrive as a computer program product at the circuitry 40 via an electromagnetic carrier signal or be copied from a physical entity 76 such as a computer program product, a memory device or a record medium such as a CD-ROM or DVD.

The computer program product determines the cost function F using the first correlation result A (formed by correlation of a code having a first offset with a signal) and the second correlation result B (formed by correlation of the code having a second offset with the signal) and controls adjustment of the first offset and the second offset in dependence upon the cost function F. At feedback loop obtained lock the computer program product controls adjustment of the first offset and the second offset in dependence upon the cost function F to maintain a predetermined relationship between the first correlation result A and the second correlation result B i.e. A/B=a/b.

Although embodiments of the present invention have been described in the preceding paragraphs with reference to various examples, it should be appreciated that modifications to the examples given can be made without departing from the scope of the invention as claimed. For example, although a particular cost function F has been described it will be appreciated that different costs functions may be used, in particular, differently expressed but mathematically equivalent cost functions may be used and reference to 'cost function' or 'cost function F' should be interpreted accordingly.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A method comprising:
   correlating a pseudo-random spreading code having a first offset with a spread signal to produce a first correlation result;
   correlating the pseudo-random spreading code with a second offset having the spread signal to produce a second correlation result;
   determining a value of a cost function using the first correlation result and the second correlation result;
   adjusting the first offset and the second offset in dependence upon the value of the cost function, the cost function using a first weighting for the first correlation result and a second, different weighting for the second correlation result such that a ratio of the first weighting to the second weighting is less than 1; and
   providing a feedback loop that is at lock when the first correlation result is a predetermined factor of the second correlation result, wherein the predetermined factor is a ratio of a first value of a correlation function, at feedback loop obtained lock, at the first offset to a second value of the correlation function, at feedback loop obtained lock, at the second offset.

2. A method as claimed in claim 1, wherein the step of adjusting the first offset and the second offset in dependence upon the value of the cost function maintains a predetermined relationship between the first correlation result and the second correlation result.

3. A method as claimed in claim 2, wherein the first correlation result is an early correlation result and the second offset is a late correlation result and the ratio of the early correlation result to the late correlation result is less than 1.

4. A method as claimed in claim 1, wherein the value of the cost function is dependent upon a ratio of the first correlation result to a first value of a correlation function, at feedback loop obtained lock, at the first offset and a ratio of the second correlation result to a second value of the correlation function, at feedback loop obtained lock, at the second offset.

5. A method as claimed in claim 1, wherein the value of the cost function is the difference between a ratio of the first correlation result to a value of a correlation function, at feedback loop obtained lock, at the first offset and a ratio of the second correlation result to a value of the correlation function, at feedback loop obtained lock, at the second offset.

6. A method as claimed in claim 1, wherein a difference between the first and second offsets is programmable.

7. A method as claimed in claim 1, wherein the second offset is delayed relative to the first offset.

8. A method as claimed in claim 1, wherein the signal is a spread spectrum communication signal.

9. A method as claimed in claim 1, wherein the signal is a received signal.

10. An apparatus comprising:
    a code generator configured for generating a pseudo-random spreading code having a first offset and the pseudo-random spreading code having a second offset;
    a first correlator configured for correlating the pseudo-random spreading code having the first offset with a spread signal to produce a first correlation result;
    a second correlator configured for correlating the pseudo-random spreading code having the second offset with the spread signal to produce a second correlation result;
    circuitry configured for determining a value of a cost function using the first correlation result and the second correlation result and configured for controlling adjustment of the first offset and the second offset in dependence upon the value of the cost function, wherein the cost function uses a first weighting for the first correlation result and a second, different weighting for the second correlation result such that a ratio of the first weighting to the second weighting is less than 1; and
    a feedback loop that is at lock when the first correlation result is a predetermined factor of the second correlation result, wherein the predetermined factor is a ratio of a first value of a correlation function, at feedback loop obtained lock, at the first offset to a second value of the correlation function, at feedback loop obtained lock, at the second offset.

11. An apparatus as claimed in claim 10, wherein the circuitry is arranged to maintain a predetermined relationship between the first correlation result and the second correlation result; wherein the circuitry enables programming of the predetermined relationship.

12. An apparatus as claimed in claim 11, wherein the circuitry is configured to:
    divide the first correlation result by a first value to provide a weighted first correlation result;
    divide the second correlation result by a second value, different to the first value, to provide a weighted second correlation result;
    enable programming of the first and second values,
    wherein the second value is greater than the first value; and
    subtract the weighted second correlation result from the second weighted correlation result.

13. An apparatus as claimed in claim 10, wherein the circuitry is configured to maintain a constant difference between the first offset and the second offset.

14. An apparatus as claimed in claim 13, wherein the constant is programmable.

15. An apparatus as claimed in claim 10, configured as a module for an electronic device.

16. An apparatus as claimed in claim 10, configured as an electronic device.

17. An apparatus as claimed in claim 10, wherein the value of the cost function is dependent upon a ratio of the first correlation result to a first value of a correlation function, at feedback loop obtained lock, at the first offset and a ratio of the second correlation result to a second value of the correlation function, at feedback loop obtained lock, at the second offset.

18. An apparatus as claimed in claim 10, wherein the value of the cost function is the difference between a ratio of the first correlation result to a value of a correlation function, at feedback loop obtained lock, at the first offset and a ratio of the second correlation result to a value of the correlation function, at feedback loop obtained lock, at the second offset.

19. A non-transitory computer-readable storage medium encoded with instructions that, when executed by a processor, enable the processor to perform:
  determining a value of a cost function based on a first correlation result, formed by correlation of a pseudo-random spreading code having a first offset with a spread signal, and a second correlation result, formed by correlation of the pseudo-random spreading code having a second offset with the spread signal;
  controlling adjustment of the first offset and the second offset in dependence upon the value of the cost function, wherein the cost function uses a first weighting for the first correlation result and a second, different weighting for the second correlation result such that a ratio of the first weighting to the second weighting is less than 1; and
  wherein a feedback loop is at lock when the first correlation result is a predetermined factor of the second correlation result, wherein the predetermined factor is a ratio of a first value of a correlation function, at feedback loop obtained lock, at the first offset to a second value of the correlation function, at feedback loop obtained lock, at the second offset.

20. A non-transitory computer-readable storage medium as claimed in claim 19, wherein the value of the cost function is dependent upon a ratio of the first correlation result to a first value of a correlation function, at feedback loop obtained lock, at the first offset and a ratio of the second correlation result to a second value of the correlation function, at feedback loop obtained lock, at the second offset.

21. A non-transitory computer-readable storage medium as claimed in claim 19, wherein the value of the cost function is the difference between a ratio of the first correlation result to a value of a correlation function, at feedback loop obtained lock, at the first offset and a ratio of the second correlation result to a value of the correlation function, at feedback loop obtained lock, at the second offset.

* * * * *

UNITED STATES PATENT AND TRADEMARK OFFICE
CERTIFICATE OF CORRECTION

PATENT NO. : 8,625,657 B2 Page 1 of 1
APPLICATION NO. : 12/593944
DATED : January 7, 2014
INVENTOR(S) : Zhengdi Qin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 830 days.

Signed and Sealed this
Twenty-second Day of September, 2015

Michelle K. Lee
*Director of the United States Patent and Trademark Office*